United States Patent
Gamal et al.

(10) Patent No.: US 10,187,327 B2
(45) Date of Patent: *Jan. 22, 2019

(54) PREDICTIVE NETWORK SYSTEM AND METHOD

(71) Applicants: Ohio State Innovation Foundation, Columbus, OH (US); University of Southern California, Los Angeles, CA (US)

(72) Inventors: Hesham El Gamal, Dublin, OH (US); Atilla Eryilmaz, Dublin, OH (US); Giuseppe Caire, Los Angeles, CA (US); Fei Sha, Los Angelese, CA (US); Margaret McLaughlin, Pasadena, CA (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,995

(22) Filed: Jun. 9, 2017

(65) Prior Publication Data

US 2017/0279739 A1 Sep. 28, 2017

Related U.S. Application Data

(63) Continuation of application No. 13/876,781, filed as application No. PCT/US2011/053746 on Sep. 28, 2011, now Pat. No. 9,680,766.

(Continued)

(51) Int. Cl.
*H04L 12/911* (2013.01)
*H04W 28/16* (2009.01)
*H04W 28/02* (2009.01)

(52) U.S. Cl.
CPC .......... *H04L 47/823* (2013.01); *H04W 28/02* (2013.01); *H04W 28/16* (2013.01)

(58) Field of Classification Search
CPC ... H04L 67/2847; H04L 67/22; H04L 67/306; H04L 67/1097; H04L 65/4084;
(Continued)

(56) References Cited

U.S. PATENT DOCUMENTS

| 5,619,274 A | 4/1997 | Roop et al. |
| 6,243,755 B1 * | 6/2001 | Takagi .................... H04L 29/06 |
| | | 709/201 |

(Continued)

FOREIGN PATENT DOCUMENTS

| KR | 10-2008-0018013 A | 2/2008 |
| KR | 10-2009-0085589 A | 8/2009 |

(Continued)

OTHER PUBLICATIONS

International Search Report for PCT/US2013/055021, dated Nov. 28, 2013; (2 pages).

*Primary Examiner* — Inder P Mehra
(74) *Attorney, Agent, or Firm* — K&L Gates LLP

(57) ABSTRACT

A proactive networking system and method is disclosed. The network anticipates the user demands in advance and utilizes this predictive ability to reduce the peak to average ratio of the wireless traffic and yield significant savings in the required resources to guarantee certain Quality of Service (QoS) metrics. The system and method focuses on the existing cellular architecture and involves the design and analysis of learning algorithms, predictive resource allocation strategies, and incentive techniques to maximize the efficiency of proactive cellular networks. The system and method further involve proactive peer-to-peer (P2P) overlaying, which leverages the spatial and social structure of the network. Machine learning techniques are applied to find the (Continued)

optimal tradeoff between predictions that result in content being retrieved that the user ultimately never requests, and requests that are not anticipated in a timely manner.

20 Claims, 3 Drawing Sheets

Related U.S. Application Data

(60) Provisional application No. 61/387,285, filed on Sep. 28, 2010.

(58) Field of Classification Search
CPC ......... H04L 67/04; H04L 67/06; H04L 67/16; H04L 67/18; H04L 67/20; H04L 67/2823; H04L 67/2842; H04L 67/2852; H04L 67/303
USPC .... 709/201, 218, 225, 230; 725/54, 116, 39, 725/48, 50, 68, 40; 455/450, 452.1
See application file for complete search history.

(56) References Cited

U.S. PATENT DOCUMENTS

| | | | |
|---|---|---|---|
| 6,324,570 B1 | 11/2001 | Tonchev et al. | |
| 6,701,316 B1 | 3/2004 | Li et al. | |
| 6,802,064 B1 | 10/2004 | Yao et al. | |
| 6,915,221 B2 | 7/2005 | Pehrsson et al. | |
| 7,403,994 B1 | 7/2008 | Vogl et al. | |
| 7,565,489 B2 | 7/2009 | Mullender et al. | |
| 7,716,425 B1 | 5/2010 | Uysal et al. | |
| 7,975,025 B1 | 7/2011 | Szabo et al. | |
| 8,169,960 B2 | 5/2012 | Bourlas | |
| 8,312,229 B2* | 11/2012 | Bloks ................... | G06F 9/4887 710/5 |
| 8,423,853 B2 | 4/2013 | Bourlas et al. | |
| 8,452,745 B2 | 5/2013 | Ramakrishna | |
| 9,002,828 B2 | 4/2015 | Fiatal | |
| 9,531,522 B2 | 12/2016 | El Gamal et al. | |
| 9,680,766 B2 | 6/2017 | El Gamal | |
| 2002/0019854 A1 | 2/2002 | Sagi | |
| 2003/0126232 A1 | 7/2003 | Mogul et al. | |
| 2004/0029591 A1 | 2/2004 | Chapman et al. | |
| 2004/0117577 A1 | 6/2004 | Bloks | |
| 2005/0032505 A1 | 2/2005 | Himelhoch | |
| 2006/0277271 A1 | 12/2006 | Morse et al. | |
| 2007/0133603 A1* | 6/2007 | Weaver ............... | H04L 43/0882 370/468 |
| 2007/0156845 A1 | 7/2007 | Devanneaux et al. | |
| 2008/0123520 A1* | 5/2008 | Ji ..................... | H04W 72/1252 370/216 |
| 2008/0242280 A1* | 10/2008 | Shapiro ............ | H04N 21/25891 455/414.3 |
| 2009/0248858 A1* | 10/2009 | Sivasubramanian | ........................ G06F 17/30887 709/224 |
| 2009/0287750 A1* | 11/2009 | Banavar ................. | H04L 29/06 |
| 2010/0172306 A1 | 7/2010 | Gill et al. | |
| 2010/0235473 A1 | 9/2010 | Koren et al. | |
| 2010/0235571 A1* | 9/2010 | Ishii ...................... | G06F 3/061 711/112 |
| 2011/0276766 A1 | 11/2011 | Fullerton et al. | |
| 2011/0316723 A1 | 12/2011 | Wohlert et al. | |
| 2012/0023570 A1 | 1/2012 | Gorodyansky | |
| 2012/0180101 A1 | 7/2012 | Davis et al. | |
| 2013/0149994 A1 | 6/2013 | Gaddam et al. | |
| 2014/0115090 A1* | 4/2014 | Hasek ................ | H04L 67/2823 709/213 |

FOREIGN PATENT DOCUMENTS

| | | |
|---|---|---|
| KR | 10-2010-0084512 A | 7/2010 |
| WO | 2009087549 | 7/2009 |

* cited by examiner

PREDICTIVE NETWORK SYSTEM AND METHOD

CROSS-REFERENCE TO RELATED APPLICATIONS

This application is a continuation of U.S. patent application Ser. No. 13/876,781, filed Jan. 2, 2014, issuing as U.S. Pat. No. 9,680,766 on Jun. 13, 2017, which is a national stage entry of PCT/US11/53746, filed Sep. 28, 2011, which claims priority to U.S. Provisional Patent Application No. 61/387,285 filed on Sep. 28, 2010. Each of which is incorporated by reference as if fully recited herein.

FIELD OF THE INVENTION

The present invention relates to network traffic management. In particular, the present invention relates to a system and method for resource allocation in wireless or wired networks.

BACKGROUND OF THE INVENTION

The wireless spectrum is a limited and nonrenewable resource which is increasingly challenged by the growing demand for service created by the widespread availability of smart devices connecting to the Internet through cellular networks. Estimates are that the rate of data traffic over cellular networks will increase 40-fold in the next five years. It is expected that, by 2015 there will be a projected 158 million users in the US accessing the Internet via a wireless mobile device, and 68.5% of the traffic will be generated by mobile video. According to a report on mobile access from the Pew Internet and American Life Project, 59% of all adults in the US today access the internet through a wireless connection, and 40% use a mobile phone to access the Web, email, or instant messaging [1]. To meet the growing load, a system and method of proactive networking is disclosed.

SUMMARY OF THE INVENTION

In the disclosed proactive networking paradigm, the network anticipates the user demands in advance and utilizes this predictive ability to reduce the peak to average ratio of the wireless traffic, and hence, yield significant savings in the required resources to guarantee certain Quality of Service (QoS) metrics. The system and method focuses on the existing cellular architecture and involves the design and analysis of learning algorithms, predictive resource allocation strategies, and incentive techniques to maximize the efficiency of proactive cellular networks. The system and method further involve proactive peer-to-peer (P2P) overlaying, which leverages the spatial and social structure of the network. The system and method may used in any data traffic management network, whether wireless or wired.

A systematic framework for the design and analysis of proactive networks is disclosed. The network may be wireless or wired. Machine learning techniques are applied to find the optimal tradeoff between predictions that result in content being retrieved that the user ultimately never requests, and requests that are not anticipated in a timely manner. The design of proactive resource allocation mechanisms, multi-casting techniques, pricing policies, and gossip algorithms enhances the theory of network optimization and control. The design of efficient device-to-device communication algorithms yields new fundamental results in network information theory.

The Pew report found that African-Americans and Latinos employ many more of the data functions of their mobile phones than Caucasian cell phone owners[1]. Thus traditional solutions to the spectrum crunch which rely on economic disincentives for use may have the effect of disproportionately shifting the burden to underserved populations. Solutions like the ones proposed herein are needed in order to preserve inexpensive access for all, not only to the informational resources of the Internet but to newer and throughput-hungry applications which benefit consumers.

Over the last few years, there has been an ever increasing demand for wireless spectrum resulting from the adoption of throughput hungry applications in a variety of civilian, military, and scientific settings. In particular, it is widely recognized that multimedia download generated by Internet-capable smart phones and other portable devices (e.g., iPad) strains cellular wireless networks to a degree where service quality for all users is significantly impacted. Because the available spectrum is limited and non-renewable, this demand poses a serious challenge leading wireless operators around the world to consider significant additional investments in the cellular infrastructure in the form of more base stations towers and the corresponding re-planning of the cellular coverage to guarantee an acceptable quality of service for these new high throughput services.

In the disclosed proactive networking paradigm, the network anticipates the user demands in advance and utilizes this predictive ability to achieve significant savings in the required resources to guarantee certain Quality of Service (QoS) metrics via judicial matching between supply and demand. This paradigm meets the demands of broadband wireless networking and other networking demands.

While there is a severe shortage in the spectrum, it is well known that a significant fraction of the available spectrum is under-utilized. This, in fact, is the main motivation for the cognitive networking framework where secondary users are allowed to use the spectrum in the off time, where the primary users are idle, in an attempt to maximize the spectral efficiency. Unfortunately, the cognitive radio approach is still facing significant regulatory and technological hurdles and, at best, offers only a partial solution to the problem. This limitation of the cognitive radio approach is intimately tied to the main reason behind the under-utilization of the spectrum; namely the large disparity between the average and peak traffic demand in the network. As an example, in a typical cellular network, one can easily see that the traffic demand in the peak hours is much higher than that at night; which inspires the different rates offered by cellular operators. Now, the cognitive radio approach assumes that the secondary users are be able to utilize the spectrum in the off peak times but, unfortunately, at those particular times one may expect the secondary traffic characteristics to be similar to that of the primary users (e.g., at night most of the primary and secondary users are expected to be idle). The proactive resource allocation framework avoids this limitation, and hence, achieves a significant reduction in the peak to average demand ratio without relying on out-of-network users.

In the traditional approach, wireless networks are constructed assuming that the subscribers are equipped with dumb terminals with very limited computational power. It is obvious that the new generation of smart devices enjoy significantly enhanced capabilities in terms of both processing power and available memory. Moreover, according to Moore's law predictions, one should expect the computational and memory resources available at the typical wireless device to increase at an exponential rate. This observation should inspire a similar paradigm shift in the design of wireless networks whereby the capabilities of the smart wireless terminals are leveraged to maximize the utility of the frequency spectrum, a non renewable resource that does not scale according to Moore's law. The disclosed proactive resource allocation framework is a significant step in this direction.

DETAILED DESCRIPTION

Figure 1:
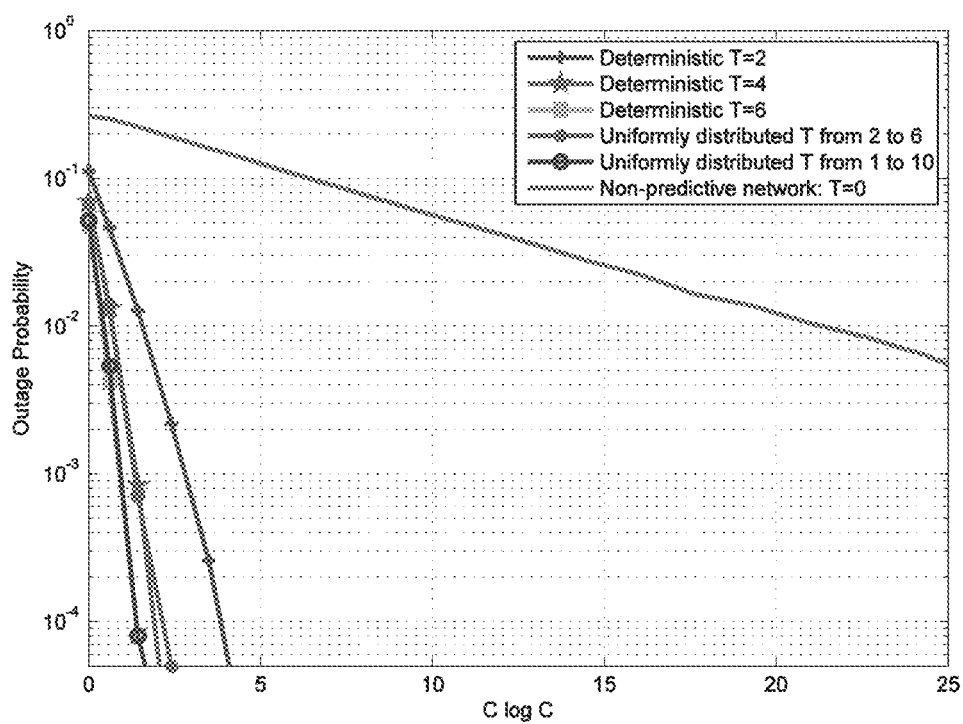
FIG. 1 is a plot of outage probability vs. C log C with $\lambda=0.8$.

The introduction of smart phones, most notably the iPhone, has resulted in a paradigm shift in the dominant traffic in mobile cellular networks. Whereas the primary traffic source in traditional cellular networks was real-time voice communication, one can argue that a significant fraction of the traffic generated by the smart phones results from non-real-time data requests (e.g., file downloads). As demonstrated in the following, this feature allows for more degrees of freedom in the design of the scheduling algorithm.

The usage of the wireless devices is highly predictable. This claim is supported by a growing body of evidence that range from the recent launch of Google Instant to the interesting findings on predictable mobility patterns. In one context, a relevant example would be the fact that user's preference for a particular news outlet is not expected to change frequently. So, if the smart phone observes that the user is downloading CNN, for example, in the morning for a sequence of days in a row then it can safely anticipate that the user will be interested in the CNN again the following day. Coupled with the fact that the most websites are refreshed at a relatively slow rate, as compared with the dynamics of the underlying wireless network, one can now see the potential for scheduling early downloads of the predictable traffic to reduce the peak to average traffic demand by maximally exploiting the available spectrum in the network idle time. When a proactive network serves a request before its deadline, the corresponding data is stored in the user device and, when the request is actually initiated, the application pulls the information directly from the memory instead of accessing the wireless network.

In existing cellular networks, each traffic request is considered urgent, at the time scale of the application layer, and hence, must be served upon initiation or dropped resulting in an outage or blocking event. However, if the user device can anticipate the requests to be generated by its corresponding user and submit them in advance, then the network will have the flexibility in scheduling these requests over an expanded time horizon as long as the imposed deadlines are not violated. To demonstrate the potential gains of such predictive operation, consider a very simplified single cell model where time is divided into slots and the requests are allowed to arrive only at the beginning of each slot. The aggregate number of arriving requests at time slot $n>0$ is denoted by $Q(n)$ which is assumed to follow a Poisson distribution with rate $\lambda$. All requests are assumed to have the same amount of required resources which is taken to be unity. That is, each request has to be totally served in a single slot by allocating one unit of resources. Moreover, the wireless network has a fixed capacity C (total resources) per slot, i.e., the number of served requests per slot cannot exceed C. Furthermore, assume that the proactive network can anticipate the arrival of each request by T time slots a-priori. Thus, if $q(n)$, $1 \leq q(n) \leq Q(n)$, is the ID of a request predicted at the beginning of time slot n, its deadline is $D_{q(n)}=n+T$. The non-predictive network corresponds to the special case of $T=0$ implying that all arriving requests at the beginning of time slot n have to be served in the same time slot n, i.e., $D_{q(n)}=n$, or otherwise they are dropped. Finally, an outage event occurs at a certain time slot if and only if at least one of the requests in the system expires in this slot.

The prediction diversity gain exhibits itself as the rate of decay of the outage probability in the asymptotic scenario where both the request arrival rate and the network capacity C grow to infinity. To capture the tradeoff between reliability, as measured by the outage probability, and throughput, as measured by the aggregate arrival rate, $\lambda = C^\gamma$, $0 \leq \gamma \leq 1$ and define the diversity gain, as a function of $\gamma$, to be $$d(\gamma) \triangleq \lim_{C \to \infty} \frac{-\log P(\text{outage})}{C \log C}.$$

This formulation is akin to the diversity-multiplexing tradeoff used to characterize the fundamental asymptotic limits of multi-terminal communication over fading channels where $\gamma$ plays the role of the multiplexing gain. The polynomial scaling of the aggregate arrival rate with C and corresponding definition for the diversity gain aim only at simplifying the analysis. In fact, a similar conclusion is derived in for the case of linear throughput scaling $\lambda = \gamma C$, $0 \leq \gamma \leq 1$ with diversity gain metric $$d_{Lin}(\gamma) \triangleq \lim_{C \to \infty} -(\log P(\text{outage}))/C.$$

The following result establishes the prediction diversity gain obtained through judicious proactive resource allocation in a simplified model.

Theorem 1.

The diversity gain of proactive scheduling for the above model with T-slot prediction equals $$d_P(\gamma) = (1+T)(1-\gamma)$$

Noting that the diversity gain of the non-predictive scenario is obtained as a special case by setting $T=0$, i.e., $d_N(\gamma)=(1-\gamma)$, this result reveals that proactive scheduling offers a multiplicative gain of $(1+T)$ in the achievable diversity advantage.

Proof:

Start with the non-predictive benchmark corresponding to $T=0$. In this case, the outage probability in any slot n corresponds to the event $\{Q(n)>C\}$, which can be expressed as $$P_N(\text{outage}) = \sum_{k=C+1}^{\infty} \frac{(C^\gamma)^k}{k!} e^{-C^\gamma}.$$

For large values of C, the above outage probability can be rewritten using Stirling's approximation as follows, $$P_N(\text{outage}) = \sum_{k=C+1}^{\infty} \frac{1}{\sqrt{2\pi k}} \frac{(C^\gamma e)^k}{k^k} e^{-C^\gamma}. \quad (1)$$

The denominator of the $k^{th}$ term in the above summation scales as $k^k$, hence, in the asymptotic scenario where $C \to \infty$ the dominant term in (1) is at $k=C+1$.

$$d_N(\gamma) = \lim_{C \to \infty} \left[ \frac{1}{2C\log C} \log(2\pi(C+1)) - \gamma \cdot \frac{C+1}{C} - \frac{C+1}{C\log C} + \frac{C+1}{C} \frac{\log(C+1)}{\log C} + \frac{C^\gamma}{C\log C} \right] \quad (2)$$

$$= 1 - \gamma.$$

For T>0, it is easy to see that the First-In-First-Out (FIFO), or equivalently Earliest Deadline First (EDF), scheduling policy minimizes the outage probability in this simple scenario. To characterize the diversity gain, the following two events to upper and lower bound the outage event are defined.

$$\mathcal{U}_d(n) \triangleq \left\{ \sum_{i=n-2T}^{n-T} Q(i) > C(T+1) \right\}, \mathcal{L}_d(n) \triangleq \{Q(n-T) > C(T+1)\}.$$

In the steady state, i.e., when $n \to \infty$, $$Pr(\mathcal{L}_d(n)) \le P_P(\text{outage}) \le Pr(\mathcal{U}_d(n)).$$

Further $$\lim_{C \to \infty} -\frac{\log Pr(\mathcal{L}_d)}{C\log C} = \lim_{C \to \infty} -\frac{\log Pr(\mathcal{U}_d)}{C\log C} = (1+T)(1-\gamma).$$

Combining these two relationships results in the diversity gain expression $$d_P(\gamma) = (1+T)(1-\gamma).$$

FIG. 1 reports a numerical example validating analytical results. The superior diversity advantage of proactive scheduling is apparent in the steeper slopes of the corresponding outage probability curves as compared with the non-predictive benchmark. It is further shown that a remarkable gain is still possible when T follows a uniform distribution and is different from one request to the next. Overall, one can see that proactive scheduling offers a significant reduction in the capacity C required to attain a certain outage probability.

A proactive networking framework rests on the notion that the information demand patterns of mobile and other device users are predictable. Such predictability can then be exploited in opportunistic pre-fetch of desired information, thus achieving improved user experience by reducing network outages, for a fixed spectrum bandwidth, or reducing the required bandwidth to achieve a certain outage probability.

The data consumption patterns that are most relevant to the context of information delivery to mobile devices are described. Key enabling techniques for discovering these patterns automatically is also described. Two main classes of information demand patterns are presented: Stationary User Behavior Patterns and Non-stationary User Behavior Patterns.

Stationary User Behavior Patterns. In their simplest forms, users have habits that can be easily captured and predicted. For example, before leaving the driveway, a user might check real-time traffic from a local traffic monitoring site. During stop-and-go traffic, the user might scan emails in his Gmail account. More precisely, at any given time t and any location x, a user might access information stochastically and request from different data resources on the web. Nevertheless, the probability of p(d|x, t) can be estimated with reasonable accuracy, where d∈D is a data resource such as a website's URL, by exploiting the user's historical usage data (such as website visit records). Furthermore, the average demand on the network associated with requesting information from d can be estimated. This is an important quantity in optimizing the capacity of predictive networks. Note that the widespread availability of GPS service on smart wireless devices allows for exploiting location information to enhance the performance of prediction algorithms.

Non-stationary User Behavior Patterns. Users also interact with data resources. The implication is that data consumption patterns vary non-stationarily. In the Gmail example above, mobile devices often display headings (and the first few lines) of emails. If the user is interested in reading a particular email, the rest of the email body is then downloaded. Similarly, for CNN.com, the user might choose to follow up a news headline by reading the full story. There is a need not only to estimate p(d|x, t) but also to predict whether the user would be interested in data resources implied by d at time t+1. Specifically, d is modeled as a collection of links to other data resources $d^1, d^2, \ldots, d^N$. As soon as d is delivered to the mobile device, these links become visible and the mobile device then estimates $p(d^n|x, t+1)$ based on the user's profile (what type of news/data interest him), historical records, etc.

There has been a considerable amount of work on the personalization of the user web experience. However, work on personalization for mobile content delivery is scarce. In particular, while motivated by opportunistic content prefetch, these works focus on batch content delivery (of a whole site) to mobile devices; therefore, a granularity much bigger than what is relevant for mobile devices. Note that smaller granularity enables much more intelligent use of communication capacity, especially if the goal is to support tens of millions of mobile subscribers. Statistical learning techniques may be used to predict users' data usage patterns.

In an example embodiment, an intelligent agent (a piece of software) runs on a mobile device. Alternatively, the intelligent agent may execute at a server. The agent logs user data usage, including the URLs of visited websites/data resources, click events (to follow up on an email or a news story), and other actions reflecting the user interaction with dynamically delivered data. Based on these historical records, statistical models of users' preference and likelihood of fetching contents from different data resources are built. Data sparsity is a key challenge this research plans to address. It may not be possible to collect enough data from a single user in order to predict her patterns precisely enough. To overcome this challenge, other users' data is leveraged to build statistical models. To start, groups sharing similar interests or web browsing patterns are clustered. Also clustered are data resources based on their similarity in topics or genres. Then models for preferences between user groups and data resource clusters are built. This approach enables access to a much larger collection of data in order to make better prediction of the user's intent. Avoiding tunnel vision is another challenge addressed in the prediction framework. Concretely, imagine that there is a major political event or natural disaster. Such events happen rarely and it is unlikely historical data will be sufficient for models to learn well. Consequently, models will likely rate news about this event as unlikely to be noticed by users, yet many users could be still interested in it even though they have never explicitly expressed interest before. To address this problem, models are built for domain knowledge (what interests the population in general), using techniques for novelty/anomaly detection.

Action: Being able to predict mobile users' data consumption patterns provides a significant advantage in designing content pre-fetch schemes so as to reduce average traffic load on the network and network outage probabilities. Concretely, pre-fetching data from source d at any time t<T if p(d|x, T) is sufficiently high. However, dynamics of user demands are also taken into consideration. Specifically, a "look-ahead" strategy is used to: i) determine an optimal time $t \leq t_d \leq T$ to issue a request to the network; ii) determine an optimal expiration time $e_d \leq T$ of the request; iii) assuming the request is fulfilled at time $(t_d+1) \leq r_d \leq e_d$, analyze the information from d and sending requests to data sources d' revealed by d (and predicted as being highly likely to be followed up by the user), with expiration time (T+1). Obviously, this process can be nested in many levels, to continue pursuing opportunistic pre-fetch of information on d'.

Optimization algorithms may optimally specify $(t_d, e_d)$ for a data source d. The problem may be cast as a decision problem based on Markov decision process (MDP). At any time t, a decision agent maintains a list of data sources and their expiration times. The decision agent can choose from a set of actions, including idle (do nothing), selecting one or a few data sources and submit to the network and specify the corresponding expiration time. In other words, specifying $(t_d, e_d)$ is partially reduced to the decision problem of whether to submit d at time t. As indicated previously, the agent may execute on the mobile device or at a server.

If a d is chosen to be submitted at time t, the decision agent suffers a penalty in the amount of $(e_d-T_d)$, where $T_d$ is the organic expiration time of d. Namely, the agent is penalized for being overly zealous to get data too early. Additionally, if a previous request d' is fulfilled, the agent receives a reward p(d'), i.e., the likelihood a user will examine data on d' (estimated by the predictive models). The central challenge is to learn such a policy that maximizes the agent's total rewards. The reward-penalty mechanism forces the agent to adopt a policy that: i) strategizes which d to select as the right d also brings opportunities of more rewards if d contains a lot of links (to other data) that could interest the user; ii) does not abuse the network by submitting requests with myopic expiration time so as to exceed network capacity. Computing the optimal policy is a well-studied problem in reinforcement learning. The techniques have been applied to problems in computer systems and networks, such as resource allocation, routing and power management. Their utility, however, has not been examined in the context of scheduling data requests on mobile devices.

Prediction under Proaction: Contents pre-fetch does not have to be initiated by passively matching well-structured users' behavior patterns. Proactive networks are capable of actively recommending and delivering contents that shape users' interest. This is achieved by building a content recommendation system that categorizes contents in much broader categories. A key notion is that, contents in a broad category are exchangeable with respect to users' general interests. These categories are then used to fulfill users' nonspecific data request, for instance, music specified in terms of genres instead of a specific performing artist. This enables proactive networks to take a further advantage of off-peak time traffic to preemptively deliver contents to user devices. Arguably, the predictor's task is easier as it only needs to predict broader categories. On the other end, the predictor will likely have less precise features to make a prediction. For example, in predicting whether a user is going to read the full body of an email on the mobile device, the sender of the email could be a very informative feature. Therefore, while contents categorization can often be solved with unsupervised machine learning algorithms (such as probabilistic latent semantic analysis or topic models), the constraint that the resulting categories need to be well predictable with users' data should be considered. This problem is addressed by jointly optimizing the objective functions used for prediction and discovering categories.

Analysis: Constructing an analytical framework for characterizing prediction and action errors is an important overarching topic. There are two major classes of errors: 1) pre-fetching data that ended up not being accessed by the user; and 2) failing to predict some of the user requests. The first class results in an increase in the average traffic load seen by the network, whereas the second leads to urgent requests that must be met instantaneously. Clearly, there is a tension between those events since a more aggressive pre-fetching policy is expected to decrease the probability of the second event at the expense of increasing the probability of the first. A deep understanding of the underlying fundamental tradeoff then guides the optimization of resource allocation and scheduling policies.

Proactive Resource Allocation and Scheduling

Figure 2:
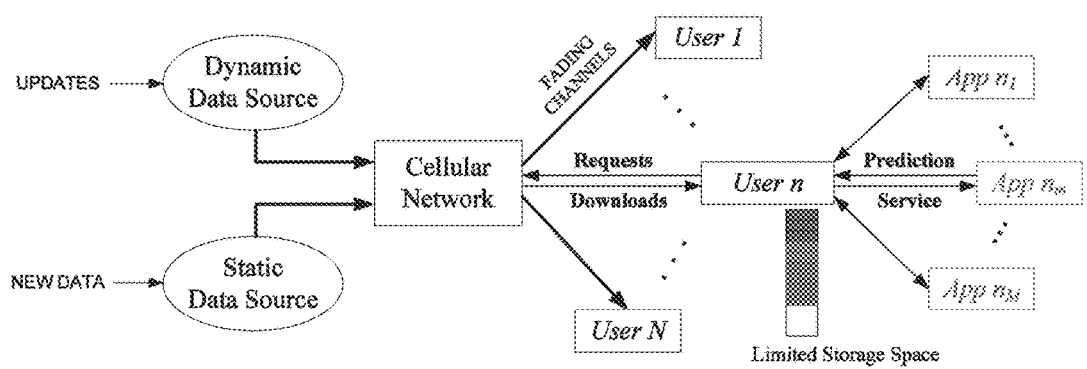
FIG. 2 is a block diagram of a predictive resource allocation configuration for cellular networks.

Referring to FIG. 2, a Predictive Resource Allocation Setup for Cellular Networks diagram is shown. The basic setup is depicted in FIG. 2 with the cellular network serving many users over fading channels, where each user runs a number of applications that demand data from dynamic or static sources.

Modeling of Data Sources and Download Costs: Data sources can be broadly categorized into two classes: static and dynamic, depending on the validity of their information content. While the content of static sources, such as stored videos, audio, books, etc., does not change over time, the dynamic sources' content, such as news, weather conditions, podcasts, webcasts, etc., continuously changes over time with different update characteristics. Due to the differences in the validity and availability of their content, the modeling and operation of proactive resource allocation differs for serving static and dynamic data sources.

The characteristics of static data sources may be captured by a graphical model where each content is modeled as nodes of an expanding graph with links connecting related content. Then, based on the approach discussed above, the predictions of a particular user interest are captured through dynamically modified link weights that indicate the probability with which a user may demand new content based on its past choices. The graph keeps expanding as new data arrives to the static data source, and new links to existing data are generated based on the observed user interest in the new content.

Alternatively, for dynamic sources, the notion of the 'type' of data, such as sport news or weather updates, etc., that is requested is established, rather than specific everlasting data as in the static case. In this case, the application demands the most recent content of the data type rather than a particular content. Thus, the stochastic and temporal characteristics of the update process for different data types is modeled and utilized in the design. The following example reveals the impact of source and user dynamics as well as transmission costs on the optimum design.

In the context of FIG. 2, suppose a newscast application is being served by the cellular network. The news content is updated as new information arrives to the data source, modeled as a Poisson process with rate updates/minute, which is reasonable considering unrelated news arrival as independent and memoryless. The user checks his application at random times, also modeled as a Poisson process with rate β checks/minute. An energy cost of C is imposed to each download from the cell station to the user to account for the transmission power consumption. Finally, the station checks for updates and downloads new content according to a Poisson process with rate μ download/min. If the user holds the most recent update when a request arrives, it is called a success, otherwise the request fails. Then, a reasonable goal is to find the optimum rate μ* at which the station should operate in order to maximize the difference of the success rate from the total failure and cost.

Figure 3:
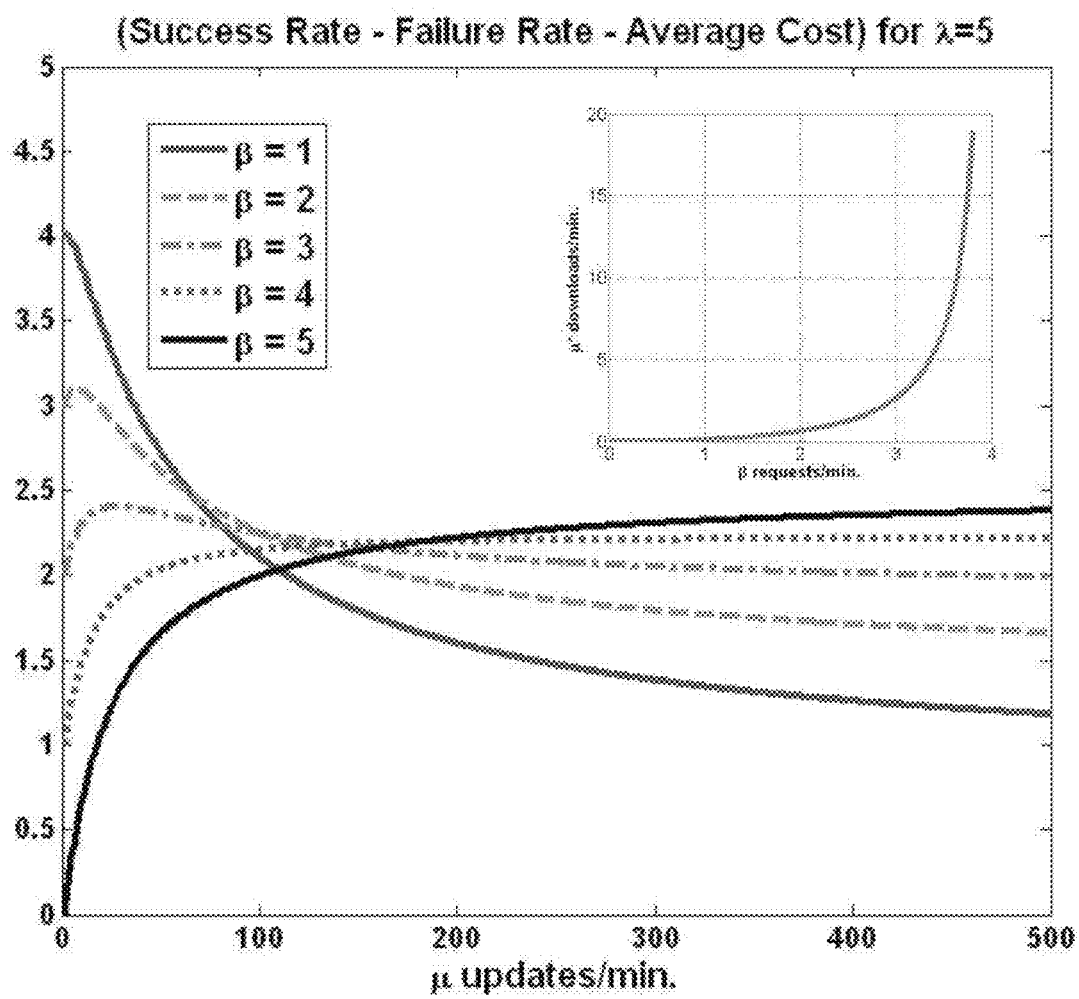
FIG. 3 is a plot of system performance for varying $\beta$ and $\mu^*$.

FIG. 3 depicts the typical forms this objective function take as a function of the server download rate μ for a constant update rate of λ=5 and unit cost, and varying values of the request rates β. Note that the behavior of the function depends on the request rate value, exhibiting a unimodal nature for small β and a monotone nature as β approaches a critical value. Using a Markov model of the system operation and renewal theorem, the optimum rate μ* may be expressed explicitly in terms of λ, β, and C as follows:

$$\mu^* = \frac{(\sqrt{C\beta^2\lambda^5(\lambda-\beta)} + \beta\lambda(\beta^2 + C\beta\lambda - \lambda^2))}{(\lambda^3 + \lambda^2\beta - (1+C)\beta^2\lambda - \beta^3)}.$$

This function is plotted in the upper-right of FIG. 3 as a function of β for λ=5, C=1, which clearly illustrates that the download rate sharply increases as β approaches the critical value around ≈4 when the above denominator vanishes. Intuitively, when β approaches this critical level, the request rate is high enough to enforce the station to download the updates almost as soon as they arrive.

This example reveals the sensitivity of optimum rate allocation to the update and request dynamics. In the context of the disclosed paradigm, by adequately anticipating the user requests, the randomness in the demand process can be significantly reduced allowing for more efficient delivery with a much lower cost. However, in order to collect these potential gains, the proactive resource allocation policy is constructed with such dynamics in mind. The following approaches may be employed: (i) modeling static sources through graphical modeling and learning; (ii) modeling of dynamic sources through probabilistic and information theoretic techniques; and (iii) developing the optimal predictive resource allocation policies using stochastic control and optimization methods.

Incorporating Storage Limitations and QoS Heterogeneity: While the available storage space increases steadily at the mobile users, the number and demanded data size of mobile applications also increases rapidly. Consequently, the amount of data that a user may potentially be interested in grows accordingly, pushing the limits of available memory of the smart phone technologies. Storage limitations may also be imposed by individual users due to privacy and security reasons. Such storage space limitations call for a significant shift in the optimal proactive resource allocation design paradigm. To see the impact of storage limitations, consider a simple scenario where the download channel yields a high rate and the prediction of application demands is perfect. Yet, if the buffer space is limited, the content cannot be downloaded immediately and must wait for the use of existing content before new content can be downloaded. Queueing theoretic tools may be employed to model these subtle dynamics in the setup of FIG. 2, initially for the single-user scenario, and then for multi-user scenario.

As a related item, it is also important to capture the varying QoS requirements of applications together with fair distribution of predictive services across users/applications. In the recent years, there have been significant advances in the design of fair and efficient network controllers for throughput maximization, and, more recently, under multi-timescale QoS constraints that capture real-time traffic requirements. Yet, these results do not directly apply to proactive resource allocation under buffer constraints since the predictive operation allows for more flexibility in serving packets before being demanded, and since the corresponding buffer dynamics are expected to be fundamentally different from traditional queues. The latter deviation is because the packets in predictive queues can be opportunistically dropped to increase the chances of future service. This calls for new means to measure the buffer content values to exploit such dropping and replacement opportunities. Various metrics may be incorporated into the optimization-based design framework.

Utilization of Innovative Transmission Techniques for Efficient Multi-Casting: Wireless communication yields a natural opportunity for efficient dissemination of common data to a number of interested users. Together with innovative coding and transmission techniques, the gains of wireless broadcast capabilities can be significant. For example, random network coding can yield orders of magnitude throughput and delay gains when used to broadcast common data to multiple users over fading channels. This setup is particularly attractive for modeling cellular downlink scenarios (as in FIG. 2), where much of predictive operation is possible. Yet, in the absence of the predictive mechanism, data of interest to multiple users is requested separately and must be re-transmitted multiple times.

Fortunately, the accurate prediction of future user requests enables the alignment of the data demands of users to exploit wireless broadcasting gains while preserving their deadline requirements. The fundamental tradeoff is whether to multicast the content to the currently interested users, or to wait to increase the multi-cast group size for a later transmission with greater gains. This question may be addressed in a control theoretic framework to optimally pack groups of demands of the same data for efficient multi-casting which minimizes the relevant cost metrics, such as failure probability, energy consumption, etc. This problem is considered in the context of downlink fading channels, under prediction randomness and errors, and for static and dynamic data sources.

Real-time Pricing for Beneficial Regulation of User Behavior: User's may be dynamically charged for information content based on its availability at the user buffer and the existing network load in order to better utilize network resources. Accordingly, users with less strict demands can be encouraged to utilize their already-downloaded content rather than download new data, and let the users with more exact demands consume the expensive resources of the system. This problem may be approached from an optimal control point-of-view by specifying the cost and pricing structure and by developing provably good policies through stochastic control and optimization methods.

Beyond Prediction: A Behavioral Science Approach. The embedded structure in the user traffic request patterns may be identified and then utilized with the corresponding predictive ability to enhance the efficiency of spectrum utilization. This paradigm may be extended by relying on the proactive network to influence the user behavior to achieve further capacity gains, while preserving, if not improving, the user experience. A behavioral science approach may be used for: 1) incentivizing favorable user behavior; and 2) assessing the efficiency of the methods. For example, based on the available user profile, the smart device may decide to download a certain viral video, during the network off-peak, in anticipation that it will be of interest to the user in the future. The user may use the smart device later to search for some media content of the same genre as the previously downloaded viral. Then, if the cached viral appears on the top of the search outcome list, coupled with the user's knowing that this choice costs less, then the user may be inclined to use this one instead of downloading another.

The user's willingness to be subject to influence with respect to content requests is suggested by work from the uses and gratifications perspective, which emphasizes the role of specific motivations such as need for entertainment or information in selections of communications media. But it is also reasonable to assume that content seekers are motivated by convenience and economic utility. Uses and gratifications associated with the web have been found to vary along such dimensions as entertainment, information, and social interaction, but convenience is an important factor. Kinnally et al. [2] found that among the factors accounting for college students' gratifications from music downloading, entertainment/passing the time was the strongest factor, followed by convenience/economic utility. Not unexpectedly, the latter factor was also found to be significantly and negatively associated with their CD purchases. The ability to sample songs and acquire single songs rather than whole albums is frequently cited, clearly economic gratifications from downloading. Cunningham and Nichols [3], in their study based on naturalistic observations of how people find video on the web, found that most sessions began by searching for a particular video, but that if it was not found rather quickly, a new search was begun. The primary purpose of the initial search seemed to be to whittle down the vast pool of potentially suitable videos to a more parsimonious set which could then be browsed or which could lead to interesting meandering down related links. Browsing was a common strategy once the 'starter' video was identified, or if there was a directory with useful categories available. These findings suggest that even though a user is initially motivated to locate a specific file, a primary motivation is to be entertained, a motivation which can be satisfied with other related, recommended content, particularly when it is easily accessible and offers greater economic utility. Recommendations obtained from a trusted social network, or from a system which extends the user's horizons through topic diversification may be particularly welcomed.

One issue that may arise is determination of each user's optimal threshold for the loss of privacy associated with customization. Clearly most users of modern telecommunications are well fit by a "self-as-source" model of interaction with media in which they have come to expect, and to prefer, a great deal of agency, interactivity, and personalization, and have resigned themselves to giving up details of their private lives in exchange. How much information users are prepared to divulge has been shown to be highly context-dependent, and is believed to be influenced by age. Students involved in a study of a music recommender system which was based on their own preference history and profile information they provided were less concerned about privacy if they could frequently check and update personal information, and were generally willing to provide information in exchange for costs savings or convenience [4].

This incentive system can relieve some of the burden on the prediction algorithm. More specifically, it may be sufficient to predict the favorite genre to the user instead of the specific media content to be requested in the future. To offer a strong incentive for the user to use the content downloaded during the off-peak time, it should be clear that this choice carries with it some economic gain. A real-time pricing framework may serve as an efficient tool to reduce the peak to average traffic demand. The efficient design of such a mechanism, however, requires the joint optimization of the resource allocation policies.

The acceptance of this approach by the public may depend critically on the careful consideration of privacy issues. In other words, making recommendations that match network interests may make users uncertain about their privacy protection. Therefore, to enable wide acceptance of the technology, a clearer understanding of the underlying fundamental tradeoff between economic gain and privacy is developed. This understanding is expected to be instrumental in the design of a recommendation system that maximizes the capacity of the network, while offering an enhanced user experience.

The Spatial Dimension: P2P Overlay over Cellular Networks

Conventional cellular and ad-hoc network architectures are intrinsically limited by fundamental bottlenecks that follow from basic information theoretic facts. It is well-known that the sum-throughput of a single cell downlink, with M antennas and K>>M single-antenna users, scales at best as $O(M \log \log K)$ for large K and fixed average received Signal-to-Noise Ratio (SNR). This scaling assumes ideal channel state information, and it incurs a degradation when the cost of estimating the fading channel state is taken into account. For this reason, even the so-called Network MIMO architectures are not envisioned to increase the pre-log factor M such that it can scale linearly with the number of users K. In order to break the cellular bottleneck, one may opt for an infrastructure-less ad-hoc network. Hierarchical cooperation or a scheme exploiting large-scale user mobility may be used in order to recover a constant throughput per source-destination pair. However, hierarchical cooperation is very complicated, requiring a very tight coordination between the users that must operate as a distributed antenna array at a larger and larger scale. It is not surprising, therefore, that no existing ad-hoc network makes actual use of such scheme as of yet. Also, a two-hop scheme that exploits mobility incurs a very significant delay $O(K \log K)$ for the most common Brownian or simple random walks mobility models. This motivates a proactive P2P wireless overlaying that achieves significantly better performance than both pure cellular and pure ad-hoc networks in the context of predictive networks advocated in this proposal.

The Case for Proactive P2P Overlays

As mentioned above, the accurate prediction of future user requests enables the alignment of the data demands of users to exploit wireless broadcasting gains (i.e., multicasting simultaneously and on the same frequency band to multiple users). A different approach may be employed where the same multicasting effect is obtained by disseminating information through the cell by exploiting device-to-device direct communications.

Because the transport capacity, in (bit×meter/s), is a fundamental limitation of conventional wireless networks, the new approach aims to increase the bit/s by bringing the average distance between users and desired content from $O(1)$ to $O(1/\sqrt{K})$ without deploying a massive media content distribution infrastructure on the cellular coverage. Towards this end, the disclosed cellular P2P framework leverages the fact that wireless cellular networks are rapidly evolving from the standard cellular paradigm to heterogeneous networks based on multiple tiers, whereby, beneath a macro-cellular umbrella, device-to-device direct communication are envisioned to become a reality in the near future. More specifically, the approach relies on injecting fresh packets into the network from one or more fixed access points at a constant rate. These packets are cached into the user devices and disseminated in the cellular coverage area by Gossip algorithms. The proactive nature of the scheme ensures that at any time, a particular user is guaranteed to find, with a high probability, the desired media content in its own cache or in the cache of its neighbors at distance $O(1/\sqrt{K})$. Because mostly local communication is required here, $O(K)$ local device-to-device connections can share the same time-frequency slot resulting in an overall system throughput that scales linearly with the number of users.

A Quantitative Example:

An asymptotic analysis of a simple scenario is provided, supporting the previous qualitative claim and motivating the formulation of specific research problems. Consider a single-cell system with fixed cell-size $O(1)$ and randomly placed K user terminals. The base-station is equipped with M antennas and at each time slot transmits a data packet to the user with the largest instantaneous channel gain, according to the HSDPA/Ev-Do scheme currently used in 3G high-data rate downlink. This can be done with spectral efficiency that scales between $O(1)$ and $O(M \log \log K)$. When a user receives a new packet, it starts disseminating it through the cell using local device-to-device communications, according to a Gossip scheme run on the Random Geometric Graph (RGG) induced by the local communication links. Assuming that the physical layer supports reliable communication at constant rate between terminals at distance $$O\left(\sqrt{\frac{\log K}{K}}\right)$$

The RGG is connected with high probability. Now, the $\in$-dissemination time $T(\in)$ of the Gossip algorithm is defined as the time after which the probability that any user misses some packets is less than $\in$. With $\in=1/\text{poly}(K)$, a Gossip algorithm on a RGG in the connectivity regime achieves $$T(\in)=O(\sqrt{K \log K})$$

By injecting new packets at constant rate $\lambda$, and using pipelining, the same delay is achievable for all such packets. In order to see this in an easy and intuitive way, replace the RGG with a square grid (mesh network) with nodes at minimum distance $O(1/\sqrt{K})$, and consider injecting the new packets at a single point at one corner of the square. Packets propagate in waves, in a pipelined way, and each wave takes $O(\sqrt{K})$ to propagate across the unit square. This estimate is tight up to some $O(\log K)$ term, due to the additional randomness of the RGG.

Based on the system described above, the following distributed caching scheme is considered. Suppose that the "popular" content has finite size L files at any given point in time (e.g., the 100 most popular TV shows, headline news, stock-exchange reports and music videos). The size of the popular content does not scale with the number of users K, but changes in time at a fixed innovation rate. In particular, assume that any user at any time slot n places an i.i.d. individual demand $q_k(n)\in\{0, 1, \ldots, L, L+1\}$, where $q_k(n)$ corresponds to no request, $q_k(n)=l\in\{1,\ldots,L\}$ corresponds to requesting packet l already present in the system, and $q_k(n)=L+1$ corresponds to requesting a "new" packet, not present in the system. Let $\Pr(q_k(n)=0)=1-p_{old}-p_{new}$, $\Pr(q_k(n)=l)=p_{old}/L$ for $l\in\{1,\ldots,L\}$ and $\Pr(q_k(n)=L+1)=p_{new}$, for some $p_{old}, p_{new}>0$ such that $p_{old}+p_{new}\leq 1$. Finally, let $Kp_{new}=\lambda$, the constant rate of innovation, and model the aggregate request of new packets at a Poisson process, as explained previously. Users cache packets as they receive them (according to the dissemination process described above), and start discarding the oldest (or least requested) ones when their buffers are full. How to selectively discard or keep "popular" packets is a problem that should be investigated. Assuming that the user demands can be predicted with $T>T(\in)$, the above scheme achieves outage probability E provided that $\lambda$ is a constant or it does not grow faster than $O(M \log \log K)$. If a new data connection was generated for each user request, as in today's cellular systems, then a downlink capacity scaling of $O(K)$ was required, which violates the information theoretic limits summarized before. In contrast, in the advocated system most of the user requests are satisfied by data already cached into the network and retrievable by local communication at distance $O(1/\sqrt{K})$, while the downlink and the Gossip dissemination can take care of the fixed rate of innovation. The above example reveals the natural match between the disclosed proactive paradigm and the P2P communication overlay on top of the cellular architecture.

Device-to-device communication in cellular networks presents several challenges. A Base-Station Assisted Device-to-Device (BSA-D2D) approach may be used in which all the mobiles in the cell are synchronized by the base station common control channel. This approach allows the possibility of centralized coordination and centralized network optimization, and represents a markedly different paradigm with respect to classical ad-hoc networks. Investigating the design tradeoffs of BSA-D2D represents a rich and novel domain at the cross-section of multiuser information theory, modern coding techniques, and network optimization, scheduling and resource allocation.

Prediction models may be expanded to take the spatial dimension into consideration. Specifically, it would be beneficial to predict where (or at which P2P network site) information could be also available. Towards this end, for each interested data source d, intelligent agents build an availability model p(y|d, t) that gives the likelihood of obtaining data from a P2P participant y at time t. Additionally, the optimal pre-fetching expands the possible actions by the agents to allow for the option of rerouting a request from the cellular network to a P2P network at a different time. Such change brings rewards to the agent as it potentially reduces network traffic. However, the agent is also at the risk of not being able to obtain the content at the presumed P2P site and if that indeed occurs, a negative reward may be given to the agent. Again, through the appropriate reward-penalty mechanism, the agent learns the optimal policy that strikes the right balance trade between taking opportunistic pre-fetching or relying on the P2P network later on.

The $\in$-dissemination time $T(\in)$ may be improved by modifying the basic Gossip algorithm. A natural extension may be as follows: instead of injecting new packets to a single user terminal (as done in today's 1×Ev-Do, or OFDM/TDMA cellular systems), the base station can multicast the same packet to a random set of users of linear size $O(K)$, namely, all users with instantaneous SNR larger than some threshold that depends on the downlink transmission spectral efficiency. Then, instead of disseminating the packet from a single point, each requesting user needs only to reach the random set of users who have received the packet. This can again be done by a Gossip algorithm that propagates queries, in a "pull" scheme (instead of "push", as in the example). There may be sharp tradeoffs of the delay $T(\in)$ in this case, in order to determine the prediction diversity gain for this type of P2P architectures.

A very important aspect in P2P networks, in general, concerns the freeriding and whitewash problems. A freerider is a node that downloads from other nodes but does not want to share, so that it takes advantage of the system without participating in it. Whitewash refers to nodes that switch identity, so that they can avoid paying the consequences of misbehavior. In wireless P2P, the utility of each node is typically defined as a weighted difference between the amount of downloaded data and the amount of uploaded data, where the coefficients reflect the application-specific gain related to downloading desired data, and the cost (typically battery energy) of transmitting data to some other user. In these terms, a generalized prisoner's dilemma is present, whose non-cooperative (single-shot game) Nash equilibrium is no cooperation (zero uploaded and downloaded data). Using the repeated game framework, all points on the Pareto boundary of the payoff region that are strictly dominated by the non-cooperative Nash equilibrium can be enforced (sub-game perfect equilibria of the repeated game). In particular, how to achieve specific points such as the proportionally fair point or the max-min fair point for the specific wireless P2P network at hand (possibly exploiting the centralized base station control channel) is a challenging problem. Furthermore, equilibria must be robust to cheating. For example, the simple tit-for-tat mechanism is reasonably adequate for Bit-Torrent: since the collaboration is happening real-time, if a user stops uploading, the other users cut him/her off creating a distinct incentive for collaboration. For distributed caching games involved in proactive P2P networking, such tit-for-tat mechanisms will not work since users do not need to download content simultaneously. Therefore, there is a need for memory and reputation in the system. Even keeping track of each user's history can be challenging: the local client of each user can record and report how much the user is donating, but clients can be easily reprogrammed to lie about user contributions. Similar problems are encountered in distributed cloud storage systems pointing towards the need for decentralized Gossip-style algorithms to maintain reputations, where each user reports how much others contributed to her/his downloads enabling the aggregation of reputation across the network via repeated message passing. Gossip algorithms have been proposed for the distributed computation of a function (e.g., the average) of local data. In this case, Gossip algorithms can be used to compute in a decentralized manner a reputation score for all users. In addition, if this reputation score takes into account the history length (e.g., as in the FICO Credit Score system), whitewash is disincentivized.

In this respect, the existing social network structure connecting the users in cyberspace, well beyond the topology constraints of the random geometric graph of the wireless network, is a resource that can be leveraged. In fact, the Gossip-based distributed reputation mechanism can run on a different time-scale on some (virtual) social network connecting the users, while the Gossip algorithm for content dissemination runs on the graph of the physical wireless network.

Exploiting the Social Structure

A comprehensive approach to understanding how individuals interact with digital media takes into account the many interconnecting subsystems in the complex ecology that governs user behaviors, including social ties, the community and geospatial context, technological affordances, and the policy environment. A factor which cuts across many of these subsystems is the individual's social capital: the access to information, connections, and resources made available through an extended network of contacts. Social capital is determined not only by the availability of networks of personal friends and family, but also through having recourse to so-called bridging social capital: the ties created by friends of friends and networks of others with common interests provide exposure to information, and resources for the formation of new relationships. Computer-mediated social networks provide not only a means to maintain existing relationships but also allow their users to avail themselves of the collective resources of very large numbers of people, most of whom they will never meet face to face. Social networking and location-based technologies may be incorporated into the P2P content application to incentivize cooperation across the network via offering the added benefit of extending the cooperating user resource networks and social capital.

Each individual user may be viewed as the nexus of a networked community or interest space, that is, a virtual network loosely coupled to similar spaces organized around other users and their peers. The network provides the user ready access to external resources as the ties created through intersecting circles of user interest spaces provide exposure to new contacts, information, and resources.

To deploy and evaluate an opportunistic peer-to-peer distribution system, online content is routed through the network via local wireless connections, smoothing out and shifting the burden of demand to off-peak hours and locally proximate content providers. Each participant has a two-tiered network of peers, the first composed of peers from within the user's existing online social networks, and the second tier from presumably unknown but geographically co-located users. Layered on top of these tiers is a location-based application that links users with each other, the places they visit, and the resources they possess. A user seeking particular online content is able to create default settings that request the desired content from an existing social network member first, or from closely proximate cohort members, or some combination thereof. Users are able to provide reputation ratings and use the application to add members from the cohort to their online social networks. Of particular interest is whether the intersection of uncommon (infrequently requested) content interests and geospatial location results over time in more persistent connections among users who are not initially included in each other's social networks. That is, repeatedly obtaining files from a geographically co-located but previously unknown source may provide a sufficient basis for addition of the source to one's social network. Tagging of file-sharing pairs and following them over time assists in determining if file sharing requests increase or if other types of connection are formalized.

Incentivizing Use: The more frequently the P2P application is used, the more rapidly and successfully online content can be transferred and the more quickly users' resource requesting behavior can be learned to facilitate provision of the desired content at the right time and place. Incentivizing users to install and use a P2P application for requesting network resources may involve a combination of factors above and beyond whatever contribution to the collective good their participation may make. Material rewards such as text-messaged coupons for discounts, iTunes credit or other digital goods can be effective. An application may have greater appeal to users if they experience a feeling of inhabiting a shared space with others, and their awareness of mediation by technology recedes into the background.

Measuring Usability and Acceptance: The P2P system may be assessed and improved through the use of cell-phone based ecological momentary assessments and interventions. (EMA/I). EMA/I is a set of strategies for collecting pre-scheduled as well as unannounced assessments and deploying interventions in people's naturally occurring environments. Measurement biases associated with recall can be avoided, and messages responding to events can be tailored dynamically as they occur. Intervention and data collection are location-independent, administered through familiar devices likely to be at hand. In an example embodiment, the instrument of intervention delivery and assessment are the same—the user's mobile phone. This method may be used to administer periodic usability surveys focusing on perceived usefulness and ease of use and to collect additional data on social influence, facilitating conditions, and intent to continue using the application. For administering of questionnaires, user information may be protected by requiring two-factor SMS user authentication. Secure hard opt-in from users may be required each time they receive a request for an assessment.

The disclosed predictive network is responsive to one of the most pressing communications issues of today: spectrum capacity. The wireless spectrum is a limited and nonrenewable resource which is increasingly challenged by the growing demand for service created by the widespread availability of smartphones and other devices connecting to the internet through cellular networks. Some wireless providers have responded to the challenge not only with plans for building new or expanding existing infrastructure and lobbying for more spectrum, but by dropping unlimited data plans for new subscribers in the hope of encouraging consumers to take advantage of available Wi-Fi access. Technological challenges which are addressed by shifting the costs of meeting them to consumers may have the unintended consequence of fueling a digital divide along economic lines. The disclosed predictive network system and method focuses on maximizing available spectrum in order to preserve inexpensive access for all, not only to the informational resources of the internet but to newer and throughput-hungry applications which benefit consumers like mobile VoIP, location-based services, and healthcare diagnosis and monitoring. The disclosed system and method provides a simple and efficient response to the capacity issue that leverages the heretofore untapped storage and memory potential of the millions of handsets in use, to smooth out demand and shift traffic from peak to off-peak time by proactive response to predictable user demands and exploitation of cache memory.

With an agent installed on the user's mobile device or at a server, machine learning techniques train on the user's content request history and create innovative techniques for learning from dynamically generated content. The agent learns what content the user wants, where she wants it, and when, and coordinates with other agents on other devices on the network to effect proactive retrieval of content. The system and method leverages commonalities of content preference, location, and request timing to maximize the availability of desired content on the user's own device and minimize demand on the network. It overlays the physical network with a social network structure used to maintain reputations and administer incentives for cooperative behavior. It delivers the component technologies needed to effect a fundamental change in the way users' mobile content demands are fulfilled, without reducing the quality of service. The predictive/proactive network takes the human/user factor as a key component of a "feedback control loop" (in a broad sense), instead of modeling users as unpredictable/memoryless random request generators.

Therefore, while certain embodiments of the present invention are described in detail above, it is to be understood that the scope of the invention is not to be considered limited by such disclosure, and modifications are possible without departing from the spirit of the invention as evidenced by the following claims:

What is claimed is:

1. A computerized method performed by a network server comprising:
    collecting from a mobile device connected to a network a plurality of network content requests;
    comparing the plurality of requests against a statistical model to predict future network content requests from the mobile device, the statistical model based at least in part on network content requests from a plurality of mobile devices;
    generating, from the comparison of requests against the statistical model, a list of anticipated network content requests from the mobile device, the list of anticipated network content requests comprising a first data source and a second data source; and
    serving, to the mobile device, network content responsive to one or more of the anticipated network content requests from a source selected from a group consisting of the first data source, the second data source, and a combination thereof, wherein the serving occurs based on, in part, a comparison between a network supply and a network demand to ensure an optimal utilization of available network bandwidth, and wherein the network content is configured to be stored in a local memory at the mobile device, thereby being available for display on the mobile device upon a user's request.

2. The computerized method of claim 1, wherein the list of anticipated requests further comprises a deadline for each anticipated request and wherein the request is served before the deadline.

3. The computerized method of claim 2, wherein the deadline is a time.

4. The computerized method of claim 1, further comprising the step of detecting a second network, the second network being a wireless network.

5. The computerized method of claim 4, wherein the network content responsive to one or more of the anticipated network content requests are served via the detected wireless network.

6. The computerized method of claim 5, wherein the detected network is a wireless local area network.

7. The computerized method of claim 4, wherein the detecting the second network comprises receiving a location of the mobile user device.

8. The computerized method of claim 7, wherein the location comprises a GPS coordinate.

9. The computerized method of claim 7, wherein the location indicates that the mobile user device is within range of a wireless network.

10. A computerized method comprising:
collecting from a mobile device a plurality of network content requests initiated by the mobile device;
analyzing the plurality of requests with a statistical model to predict anticipated network content requests from the mobile device, the statistical model based, at least in part, on network content requests from the mobile device;
generating a first anticipated network content request from the mobile device, the first anticipated network content requests comprising a first data source and a second data source; and
serving, to the mobile device, network content responsive to one or more of the anticipated network content requests from a source selected from a group consisting of the first data source, the second data source, and a combination thereof, wherein the serving occurs based on, in part, a comparison between a network supply and a network demand to ensure an optimal utilization of available network bandwidth, and wherein the network content is configured to be stored in a local memory at the mobile device, thereby being available for display on the mobile device upon a user's request.

11. The computerized method of claim 10, wherein the statistical model is further based, at least in part, on network content requests from a plurality of mobile devices, wherein the plurality of mobile devices includes the mobile device.

12. The computerized method of claim 10, wherein the first predicted anticipated network content request is one of a plurality of generated predicted anticipated network content requests in a list.

13. The computerized method of claim 10, wherein the statistical model comprises daily network content requests from the mobile device.

14. The computerized method of claim 10, wherein analyzing the plurality of requests comprises clustering content from the plurality of mobile devices based on similarity in topics.

15. A computerized method performed by a network server comprising:
collecting from a mobile user device a plurality of requests from a user for content from a network, the plurality of requests initiated by the mobile user device;
analyzing the plurality of requests for content from the mobile user device against a statistical model to predict anticipated requests from the user mobile device, the statistical model utilizing dynamic data requests for content from the network obtained from a plurality of mobile devices;
generating a list of anticipated requests for content from the user, the list of anticipated network content requests comprising a first data source and a second data source;
serving to the mobile user device, before an actual request for content, content data responsive to each anticipated request in the list from a source selected from a group consisting of the first data source, the second data source, and a combination thereof, the content data configured to be stored in a memory in the mobile user device, wherein the serving occurs based on, in part, a comparison between a network supply and a network demand to ensure an optimal utilization of available network bandwidth; and
receiving at least one actual request for content from the individual user initiated at the mobile user device, wherein in response to the at least one actual request for content from the individual user, the content data from the memory is presented on the mobile device.

16. The computerized method of claim 15, wherein serving comprises establishing a timeslot for serving network content.

17. The computerized method of claim 15, wherein the timeslot is before a deadline.

18. The computerized method of claim 15, wherein generating a list of anticipated requests comprises clustering content based on similarity in topics.

19. The computerized method of claim 15, further comprising providing an incentive to the mobile user device, the incentive responsive to the at least one actual request.

20. A system comprising:
a memory, wherein the memory stores a plurality of requests from a user for content from a network, the plurality of requests initiated by a mobile user device; and
a processor, wherein the processor is configured to:
analyze the plurality of requests for content from the mobile user device against a statistical model to predict anticipated requests from the user mobile device, the statistical model utilizing dynamic data requests for content from the network obtained from a plurality of mobile devices;
generate a list of anticipated requests for content from the user, the list of anticipated network content requests comprising a first data source and a second data source;
serve to the mobile user device, before an actual request for content, content data responsive to each anticipated request in the list from a source selected from a group consisting of the first data source, the second data source, and a combination thereof, the content data configured to be stored in a memory in the mobile user device, wherein the serving occurs based on, in part, a comparison between a network supply and a network demand to ensure an optimal utilization of available network bandwidth; and
receive at least one actual request for content from the individual user initiated at the mobile user device, wherein in response to the at least one actual request for content from the individual user, the content data from the memory is presented on the mobile device.

* * * * *